(12) United States Patent
Angelopoulos et al.

(10) Patent No.: US 6,241,913 B1
(45) Date of Patent: *Jun. 5, 2001

(54) BRANCHED ELECTRICALLY CONDUCTIVE POLYMERS AND PRECURSORS AND APPLICATIONS THEREOF

(75) Inventors: Marie Angelopoulos, Cortlandt Manor; Yun-Hsin Liao, Tarrytown, both of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/722,283

(22) Filed: Sep. 27, 1996

(51) Int. Cl.$^7$ .......................................................... H01B 1/12
(52) U.S. Cl. ............................................................. 252/500
(58) Field of Search ................................. 252/500, 518; 524/378, 422, 423

(56) References Cited

U.S. PATENT DOCUMENTS

| 4,148,704 | * | 4/1979 | Tsou | 204/181 C |
| 4,604,427 | * | 8/1986 | Roberts et al. | 525/185 |

(List continued on next page.)

FOREIGN PATENT DOCUMENTS

| 3259922 | * | 11/1991 | (JP) . |
| 5-979998 | | 4/1993 | (JP) . |
| 5-239207 | | 9/1993 | (JP) . |

OTHER PUBLICATIONS

Huang, W.S., et al., "Polyaniline, a Novel Conducting Polymer", J. Chem. Soc., Faraday Trans. 1, 82(8), 2385–2400, Aug. 1986.*

Kathirgamanathan, P., et al., "Novel conducting soluble copolymers of aniline", J. Mater. Chem., 1(1), 141–142, Month not known; abstract only –1991.*

Mailhe–Randolph, C., et al., "Morphology of paraphenylenediamine–aniline conducting copolymers", Ber. Bunsen–Ges. Phys. Chem., 93(8), 905–908, Month not known; abstract only –1989.*

Yang et al "Electrochemical copolymerization of aniline and para–phenylenediamine", J. of App. Electrochem, 24(1994) 166–178.*

Tang et al "Electropolymerization of aniline modified by para–phenylenediamine", Electrochem. Acta, vol. 40(7) pp. 849–857, 1995.*

*Primary Examiner*—Mark Kopec
(74) *Attorney, Agent, or Firm*—Daniel P. Morris (57) ABSTRACT

The present invention is directed to a polymer selected from a precursor to an electrically conductive polymer and an electrically conductive polymer. The polymer has a branched structure. The polymer is formed from polymerization of momomers of which at least one monomer has more than one polymerizable site. One of the polymerizable monomers or units can have structural formula $X—(M)_n$ where X is a base element of the unit, M is the polymerization functional site, n is the number of M sites; and n>1. The polymer can be formed from more than one polymerization unit having different base elements, polymerization functional units and different values of n.

16 Claims, 10 Drawing Sheets

U.S. PATENT DOCUMENTS

| | | | |
|---|---|---|---|
| 4,956,441 | * | 9/1990 | Kathirgamanthan et al. ........ 528/171 |
| 5,008,041 | * | 4/1991 | Cameron et al. ..................... 252/500 |
| 5,053,466 | * | 10/1991 | Shimizu et al. ........................ 526/62 |
| 5,079,096 | * | 1/1992 | Miyake et al. ........................ 428/500 |
| 5,205,965 | * | 4/1993 | Uetani et al. ......................... 252/500 |
| 5,225,495 | * | 7/1993 | Han et al. .......................... 525/327.4 |
| 5,243,024 | * | 9/1993 | Bockrath et al. ..................... 528/353 |
| 5,254,633 | * | 10/1993 | Han et al. .......................... 525/327.4 |
| 5,262,483 | * | 11/1993 | Jongeling ............................. 525/185 |
| 5,264,552 | * | 11/1993 | Abe et al. ............................. 528/422 |
| 5,310,781 | * | 5/1994 | Wudl et al. .......................... 524/599 |
| 5,324,815 | * | 6/1994 | Ohtani et al. ......................... 528/422 |
| 5,354,816 | * | 10/1994 | Shimizu et al. ...................... 525/535 |
| 5,370,825 | * | 12/1994 | Angeopoulos et al. ............. 252/500 |
| 5,427,715 | * | 6/1995 | Ohwa et al. .......................... 252/500 |
| 5,436,796 | * | 7/1995 | Abe et al. ............................. 361/525 |
| 5,578,249 | * | 11/1996 | Ohtani et al. ......................... 252/519 |
| 5,633,326 | * | 5/1997 | Patil et al. ......................... 525/327.6 |

* cited by examiner (A) Short branch (B) Long branch (C) Dentritic

BRANCHED ELECTRICALLY CONDUCTIVE POLYMERS AND PRECURSORS AND APPLICATIONS THEREOF

FIELD OF THE INVENTION

The Present invention is directed to branched electrically conductive polymers and branched electrically conductive polymer precursors and applications thereof.

BACKGROUND

Electrically conductive organic polymers have been of scientific and technological interest since the late 1970's. These relatively new materials exhibit the electronic and magnetic properties characteristic of metals while retaining the physical and mechanical properties associated with conventional organic polymers. Examples of electrically conducting polymers are polyparaphenylene vinylenes, polyparaphenylenes, polyanilines, polythiophenes, polyazines, polyfuranes, polythianaphthenes polypyrroles, polyselenophenes, poly-p-phenylene sulfides, polyacetylenes formed from soluble precursors, combinations thereof and blends thereof with other polymers and copolymers of the monomers thereof.

Conducting polymers are conjugated systems which are made electrically conducting by doping. The doping reaction can involve an oxidation, a reduction, a protonation, etc. The non-doped or non-conducting form of the polymer is referred to herein as the precursor to the electrically conducting polymer. The doped or conducting form of the polymer is referred to herein as the conducting polymer.

Conducting polymers have potential for a large number of applications in such areas as electrostatic charge/discharge (ESC/ESD) protection, electromagnetic interference (EMI) shielding, resists, electroplating, corrosion protection of metals, and ultimately metal replacements, i.e. wiring, plastic microcircuits, conducting pastes for various interconnection technologies (solder alternative), etc. Many of the above applications especially those requiring high current capacity or those requiring good mechanical/physical properties have not yet been realized because the conductivity of the processible conducting polymers and the mechanical/physical properties of these polymers are not yet adequate for such applications.

The polyaniline class of conducting polymers are quite promising materials for many commercial applications. Great strides have been made in making these polymers processable. They are environmentally stable and allow chemical flexibility which in turn allows tailoring of their properties. A number of polyaniline coatings have been developed and commercialized for a number of applications such as ESD protection and corrosion protection.

In many of the current applications, polyaniline is generally applied as a coating to a specific substrate, e.g. metal, glass, plastic, etc.. For ESD protection or EMI Shielding, for example, the polyaniline is most commonly applied as a coating unto a plastic which has the physical and mechanical properties required for the particular application. Alternatively, the polyaniline can be incorporated as a conducting filler into a polymer matrix having properties appropriate for a given application. Thus, the polyaniline is used for its conducting properties and the substrate polymer or polymer matrix is used for its physical/mechanical properties. Polycarbonate is generally used to manufacture computer housings, keyboards, electronic component carriers, etc.. because it is a material that has excellent impact resistance, and overall mechanical/physical properties.

Polyaniline or any of the other conducting polymers cannot be used alone to manufacture such parts because they do not have the appropriate physical and mechanical properties. They are relatively low molecular weight materials which tend to form brittle films having low impact resistance and relatively poor tensile properties.

K. T. Tzou and R. V. Gregory (Polymer Preprints, Vol. 1, 1994) has recently reported processing fibers from polyanilines. These fibers are quite promising for commercial applications. However, the tenacities and breaking elongations of these fibers do not yet compete with those attained with conventional plastics.

The conductivity of the polyanilines is generally on the low end of the metallic regime. The conductivity is on the order of $10^0$ S/cm. Some of the other soluble conducting polymers such as the polythiophenes, poly-para-phenylenevinylenes exhibit conductivity on the order of $10^2$ S/cm.

The conductivity ($\sigma$) is dependent on the number of carriers (n) set by the doping level, the charge on the carriers (q) and on the interchain and intrachain mobility ($\mu$) of the carriers.

$$\sigma = n\, q\, \mu$$

Generally, n (the number of carriers) in these systems is maximized and thus, the conductivity is dependent on the mobility of the carriers. To achieve higher conductivity, the mobility in these systems needs to be increased. The mobility, in turn, depends on the morphology of the polymer. The intrachain mobility depends on the degree of conjugation along the chain, presence of defects, and on the chain conformation. The interchain mobility depends on the interchain interactions, the interchain distance, the degree of crystallinity, etc. The mobility of the carriers between chains tends to limit the overall conductivity as the carriers need to hop from one chain to another which is an ineffective process. To enhance the conductivity, it would be necessary to provide a more effective interchain transport mechanism.

It is desirable to enhance the conductivity of the processable electrically conducting polymers and to enhance the physical and mechanical properties of both the conducting polymer precursors and the conducting polymers to allow them to more appropriately meet the needs of a number of applications.

OBJECTS

It is an object of the present invention to provide branched electrically conductive polymer precursors and branched electrically conductive polymers.

It is another object of the present invention to provide branched electrically conductive polymer precursors and branched electrically conductive polymers with adjustable branch length and branch density.

It is another object of the present invention to provide branched electrically conductive polymer precursors and branched electrically conductive polymers having improved electrical properties.

It is another object of the present invention to provide branched electrically conductive polymer precursors and branched electrically conductive polymers having improved interchain transport.

It is another object of the present invention to provide branched electrically conductive polymers and branched electrically conducting polymer precursors having high molecular weight and a broad molecular weight distribution.

It is another object of the present invention to provide branched electrically conductive polymers and branched electrically conductive polymer precursors having an increased glass transition temperature.

It is an object of the present invention to provide branched electrically conductive polymer precursors and branched electrically conductive polymers having a similar glass transition temperature to linear electrically conductive polymers and electrically conducting polymer precursors.

It is another object of the present invention to provide branched electrically conductive polymers and branched electrically conductive polymer precursors having an increased solution viscosity.

It is another object of the present invention to provide branched electrically conductive polymers and branched electrically conductive polymer precursors having an increased melt viscosity.

It is an object of the present invention to provide branched electrically conductive polymer precursors and branched electrically conductive polymers having improved mechanical and physical properties.

It is an object of the present invention to provide branched electrically conducting polymer precursors and branched electrically conductive polymers having improved environmental and thermal stability.

SUMMARY OF THE INVENTION

A broad aspect of the present invention is a polymer selected from a precursor to an electrically conductive polymer and an electrically conductive polymer. The polymer has a branched structure.

In a more specific aspect of the present invention the polymer is formed from polymerization of momomers of which at least one monomer has more than one polymerizable site.

In another more specific aspect of the present invention one of the polymerizable monomers or units have structural formula X—(M)$_n$ where X is a base element of the unit, M is the polymerization functional site, n is the number of M sites; and n>1.

In another more specific aspect of the present invention the polymer can be formed from more than one polymerization unit or monomer having different base elements, polymerization functional sites and different values of n.

BRIEF DESCRIPTION OF THE DRAWINGS

Further objects, features, and advantages of the present invention will become apparent from a consideration of the following detailed description of the invention when read in conjunction with the drawings FIG's. in which:

FIG. 3.(a) is a Gel Permeation Chromatograph (GPC) of polyaniline base in NMP (0.1%). GPC shows a bimodal distribution—A very high molecular weight fraction (approx. 4%) and a major peak having lower molecular weight.(b) GPC of polyaniline base in NMP (0.1%) with 0.5% LiCl. GPC shows a monomodal molecular weight distribution, high molecular weight fractions are eliminated

DETAILED DESCRIPTION

Figure 1:
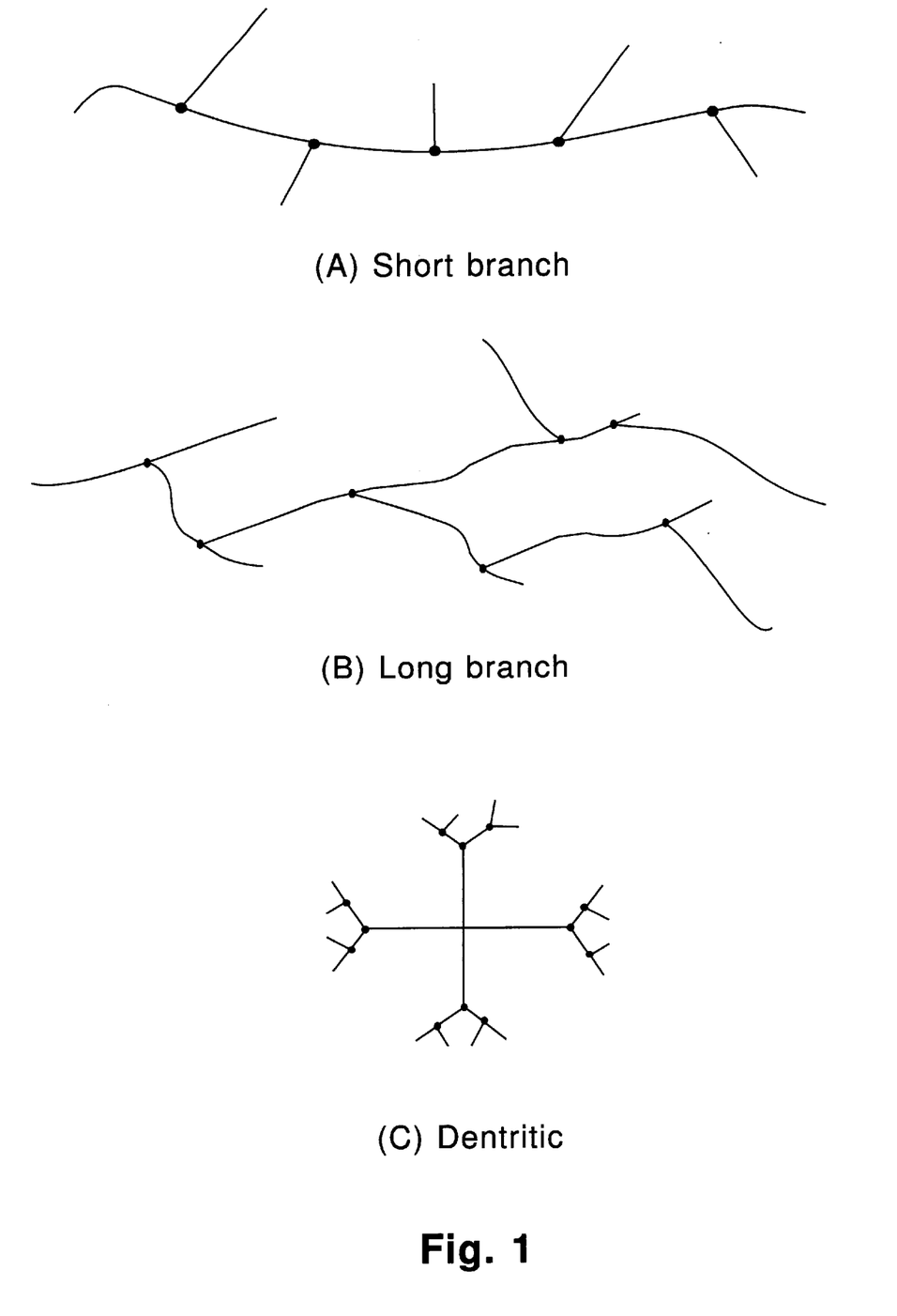
FIG. 1 is a schematic of structures characteristic of (a) short branched, (b) long branched, and (c) dentritic polymers.

Polymers are generally classified as linear, branched, or crosslinked depending on their structure. Branched polymers are those in which there are side branches of linked monomer molecules protruding from various sites along the main polymer chain. A branched polymer can be comblike in structure with either long or short branches as shown in FIGS. 1.a and 1.b. When there is extensive branching, the polymer can have a dentritic structure in which there are subbranches, that is, secondary, tertiary, etc. branches protruding from the main branch point off the main chain as depicted in FIG. 1.c. Conducting polymer precursors and conducting polymers have been synthesized as linear polymers.

The present invention is directed to branched electrically conducting polymer precursors and branched conducting polymers having different amounts and controllable amounts of branch lengths and densities. By controlling the degree of branching, the physical, mechanical, electrical and solution properties of these polymers can in turn be controlled and enhanced. The present invention is also directed toward controlling the molecular weight distribution of conducting polymer precursors and conducting polymers.

Examples of polymers which can be used to practice the present invention are of substituted and unsubstituted homopolymers and copolymers of aniline, thiophene, pyrrole, p-phenylene sulfide, azines, selenophenes, furans, thianaphthenes, phenylene vinylene, phenylene, acetylene, etc. and the substituted and unsubstituted polymers, polyparaphenylenes, polyparaphenylevevinylenes, polyanilines, polyazines, polythiophenes, poly-p-phenylene sulfides, polyfuranes, polypyrroles, polythianaphthenes, polyselenophenes, polyacetylenes formed from soluble precursors and combinations thereof and copolymers of monomers thereof. The general formula for these polymers can be found in U.S. Pat. No. 5,198,153 to Angelopoulos et al., the teaching of which is incorporated herein by reference. While the present invention will be described with reference to a preferred embodiment, it is not limited thereto. It will be readily apparent to a person of skill in the art to extend the teaching herein to other embodiments.

Figure 2:
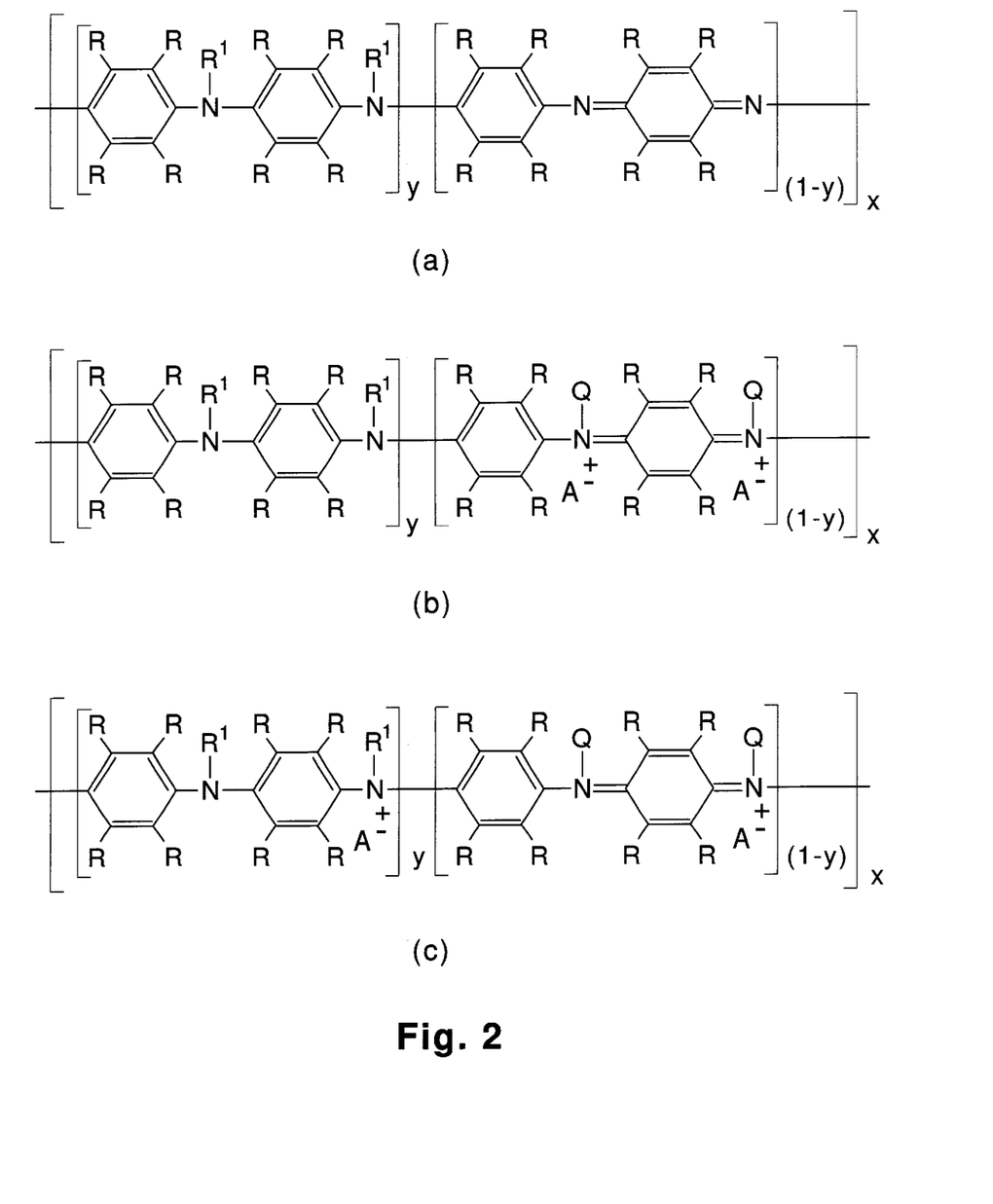
FIG. 2. is (a) a general formula for polyaniline in the non-doped or precursor form, (b) is a general formula for a doped conducting polyaniline, (c)is a general formula for the polysemiquinone radical cation form of doped conducting polyaniline.

One type of polymer which is useful to practice the present invention is a polyaniline having general formula shown in FIG. 2.a. The most preferred embodiment is emeraldine base form of the polyaniline wherein y has a value of approximately 0.5, however, it is not limited thereto. The base form is the non-doped form of the polymer. The non-doped form of polyaniline and the non-doped form of the other conducting polymers is herein referred to as the electrically conducting polymer precursor.

In FIG. 2.b, polyaniline is shown doped with a dopant. In this form, the polymer is in the conducting form. If the polyaniline base (non-doped polymer) is exposed to cationic species QA, the nitrogen atoms of the imine (electron rich) part of the polymer becomes substituted with the Q+ cation to form an emeraldine salt as shown in FIG. 2.b. Q+ can be selected from H+ and organic or inorganic cations, for example, an alkyl group or a metal.

QA can be a protic acid where Q is hydrogen. When a protic acid, HA, is used to dope the polyaniline, the nitrogen atoms of the imine part of the polyaniline are protonated. The emeraldine base form is greatly stabilized by resonance effects. The charges distribute through the nitrogen atoms and aromatic rings making the imine and amine nitrogens indistinguishable. The actual structure of the doped form is a delocalized polysemiquinone radical cation as shown in FIG. 2.c.

Polyaniline is generally synthesized as a linear polymer by oxidatively polymerizing the monofunctional, aniline monomer with an oxidant such as ammonium peroxydisulfate.

This linear polymer, in the emeraldine base form, is soluble in various organic solvents and in various aqueous acid solutions. Examples or organic solvents are dimethylsulfoxide (DMSO), dimethylformamide (DMF), N-methylpyrrolidinone (NMP), dimethyl propylene urea, tetramethyl urea, toluene, m-cresol, etc. This list is exemplary only and not limiting. Examples of aqueous acid solutions is 80% acetic acid and 60–88% formic acid. This list is exemplary only and not limiting.

Figure 3A:
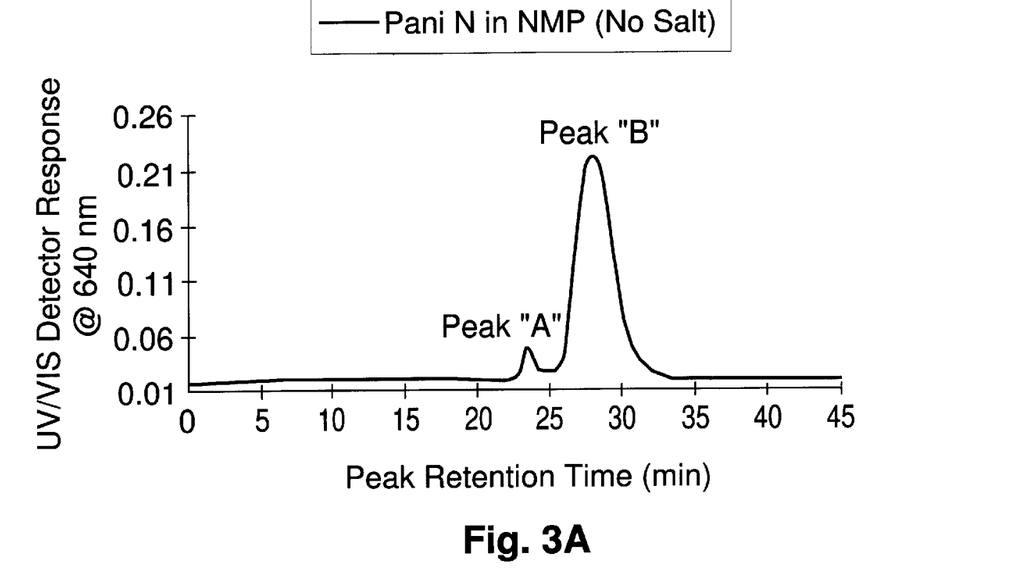
Figure 3B:
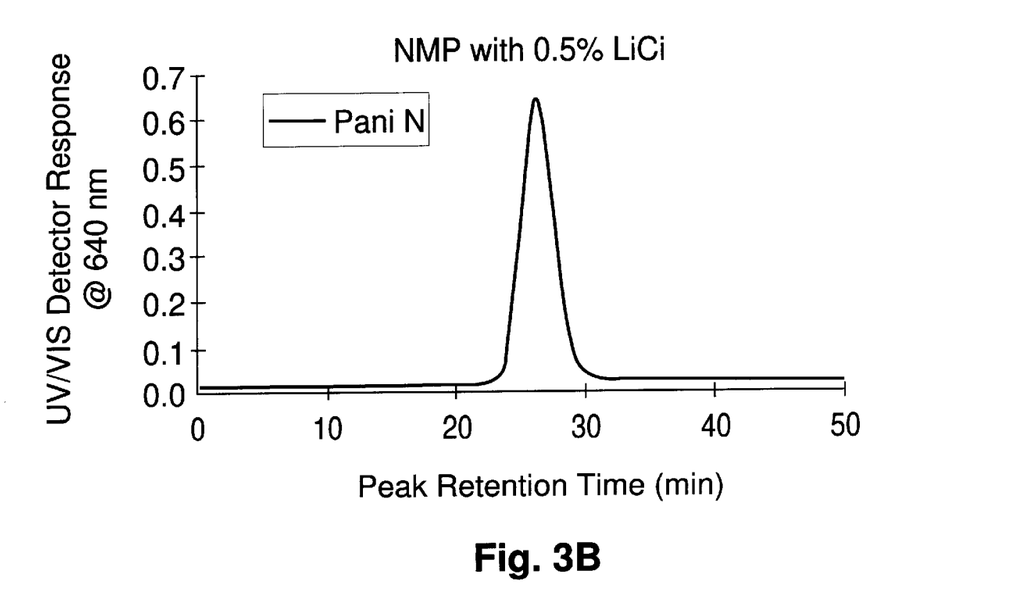

Polyaniline base is generally processed by dissolving the polymer powder in a solvent, most commonly in NMP. These solutions exhibit a bimodal or trimodal distribution in Gel Permeation Chromatography (GPC) as a result of aggregation induced by internal hydrogen bonding between chains as previously described in U.S. patent application Ser. No. 08/370,128, filed on Jan. 9, 1996, the teaching of which is incorporated herein by reference. The GPC curve for typical polyaniline base in NMP is shown in FIG. 3.a. As can be seen, the polymer consists of a small fraction of high molecular weight material, Peak A, ($\cong$500K), however, the bulk of the material consists of relatively low molecular weight, Peak A, ($\cong$30 K). The addition of LiCl to the polyaniline solution can eliminate the high molecular weight fraction (FIG. 3.b) as this is due to hydrogen bonding which can be disrupted by LiCl as has been previously described in the above referenced patent application.

Figure 4:
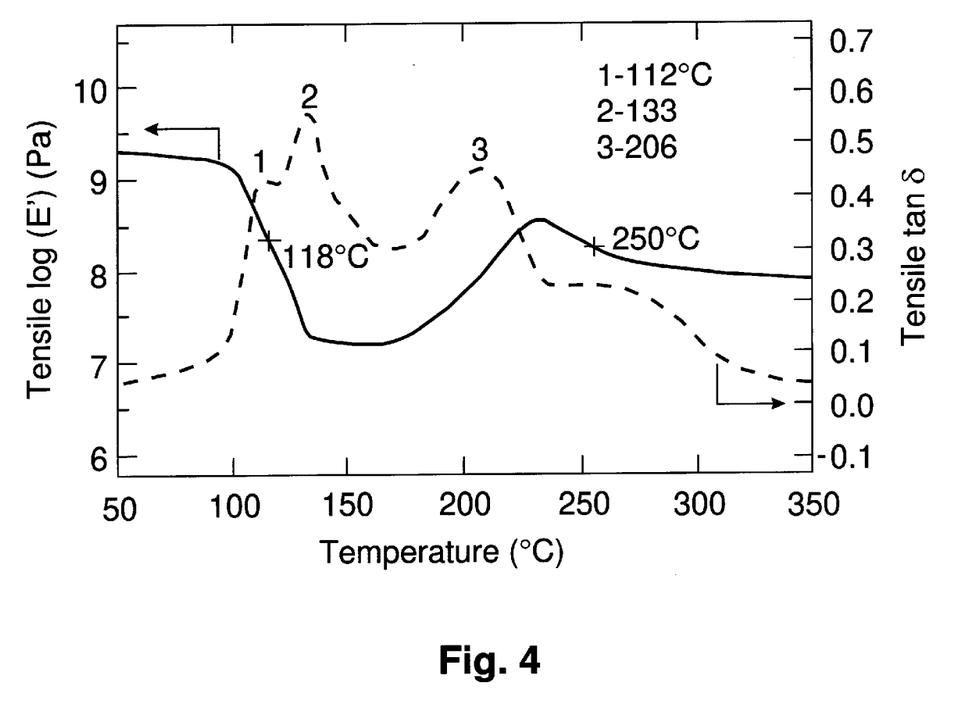
FIG. 4 is a Dynamic Mechanical Thermal Analysis (DMTA) plot for polyaniline base film cast from NMP. (First Thermal Scan; under Nitrogen).
Figure 5:
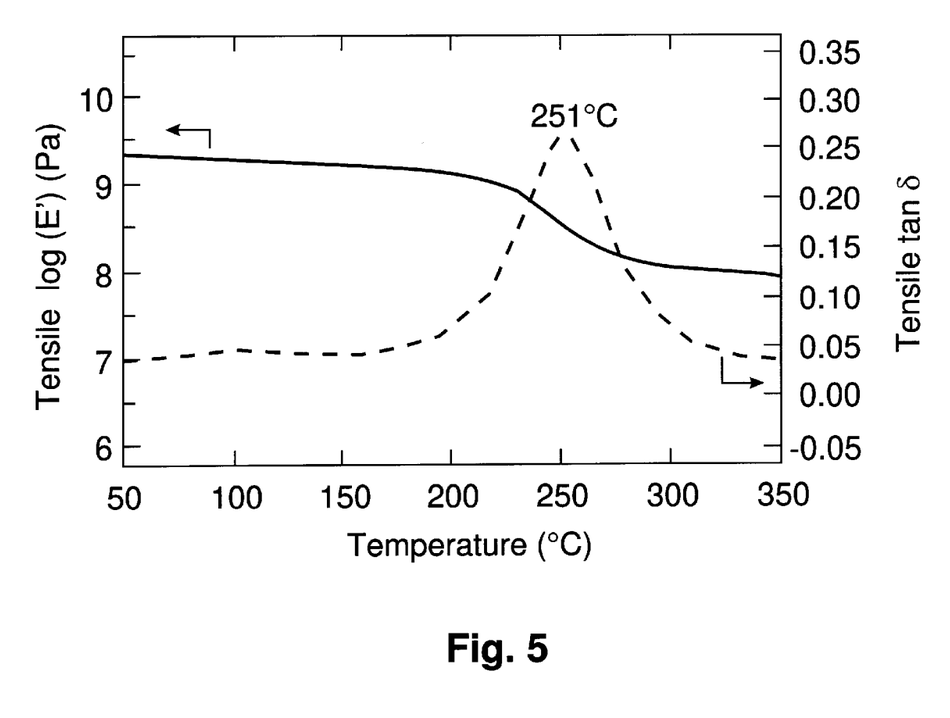
FIG. 5 is a DMTA plot which represents the second thermal scan for a polyaniline base film cast from NMP. This same film was previously scanned as shown in FIG. 4. The film contains no residual solvent.

FIGS. 4 and 5 show the dynamic mechanical thermal analysis (DMTA) for a polyaniline base film processed from NMP alone. FIG. 4 is the first scan where a Tg of $\cong$118° C. is observed as a result of the residual NMP which is present in the film. FIG. 5 is the second thermal scan of the same film. This film has no residual solvent and a Tg of $\cong$251° C. is measured for the polyaniline base polymer.

Polyaniline base films tend to be brittle, have low elongation at break, low modulus, low impact resistance. One reason for this is that the material is of low molecular weight as can be seen by GPC (FIG. 3.)

Branching was introduced into polyaniline by using multifunctional polymerizable monomers such as anilines in the polymerization reaction. It is critical to control the amount of branching that is introduced into the polymer backbone because branching in general will disrupt the ability of the polymer chains to crystallize or to order which is necessary for good electrical conduction. In addition, incorporation of substituents on the polyaniline backbone has generally resulted in a dramatic decrease in conductivity. The decrease in conductivity has generally been proportional to the steric constraint of the substituent. As the steric constraint increases, the conductivity decreases. The decrease in conductivity occurs for two reasons. One is that the substituent disrupts the coplanarity of the aromatic rings and thus decreases the intrachain conjugation. In addition, the substituent acts as a spacer between chains thereby increasing the interchain distance. Both factors will tend to limit the mobility of the carriers and in turn the conductivity. Therefore, it is important to control the branch length and the degree of branching to prevent the above from occurring. Also, if the branching is done controllably, the branches can provide a new transport mechanism between chains as the carriers can move along the branch to reach another chain and thus bypass the hopping mechanism.

For example, highly branched polyaniline was synthesized by polymerizing 1,3 phenylenediamine (m-PDA). Polyanilines with various levels of branching were made by copolymerizing m-PDA with aniline. The degree of branching was controlled by the amount of m-PDA in the initial polymerization reaction. In addition, multiple monomers can be used in the polymerization reaction. For example, a tricopolymer is made by copolymerizing aniline, m-PDA, and o-ethoxysubstituted aniline. The amounts of each substituent in the final polymer is controlled by controlling the amount of each monomer in the polymerization reaction. A series of branched polyanilines were made by copolymerizing m-PDA with aniline in which the feed ratio of m-PDA in the polymerization reaction varied from 0.001 mole % to 100 mole %.

Figure 6:
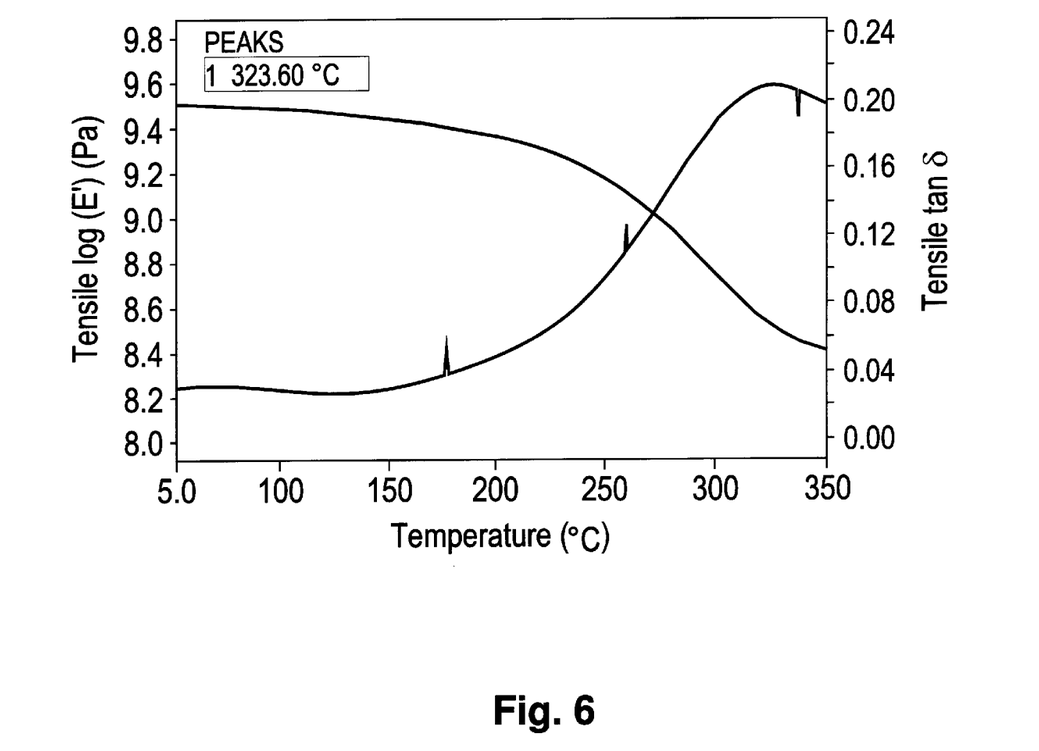
FIG. 6 is a DMTA plot for a branched polyaniline base film (polyaniline made with 5 mole % of bifunctional m-PDA) cast from NMP. (Second Thermal Scan). Film Contains no residual solvent.

The branched polyanilines have completely different properties as compared to those of the linear polymer. The mechanical properties are improved with increased branching. The DMTA of the branched polyaniline base (made in which 5 mole % of the m-PDA was used in the copolymerization reaction with aniline) film cast from NMP exhibits an increased Tg of 323° C. on the second thermal scan as compared to 250° C. for the linear polyaniline base polymer processed from NMP (FIGS. 6 and 5). (A 73° Increase.) The branched structure of the polymer impedes rotation of the main chain thus giving a stiffer molecule thus having a higher glass transition temperature. Table 1 depicts the change in the glass transition temperature of the polymer as a function of the degree of branching. All the branched polymers have higher glass transition temperature than the linear polymer and also the glass transition temperature increases with increasing degree of branching. In addition, the modulus of the polymer also increases with increasing degree of branching which implies increased stiffness in the polymer due to branching. Thus, the mechanical and physical properties (glass transition temperature, modulus, impact resistance, tensile properties, etc. of the polyaniline can be tuned by controlling the degree of branching.

Figure 7:
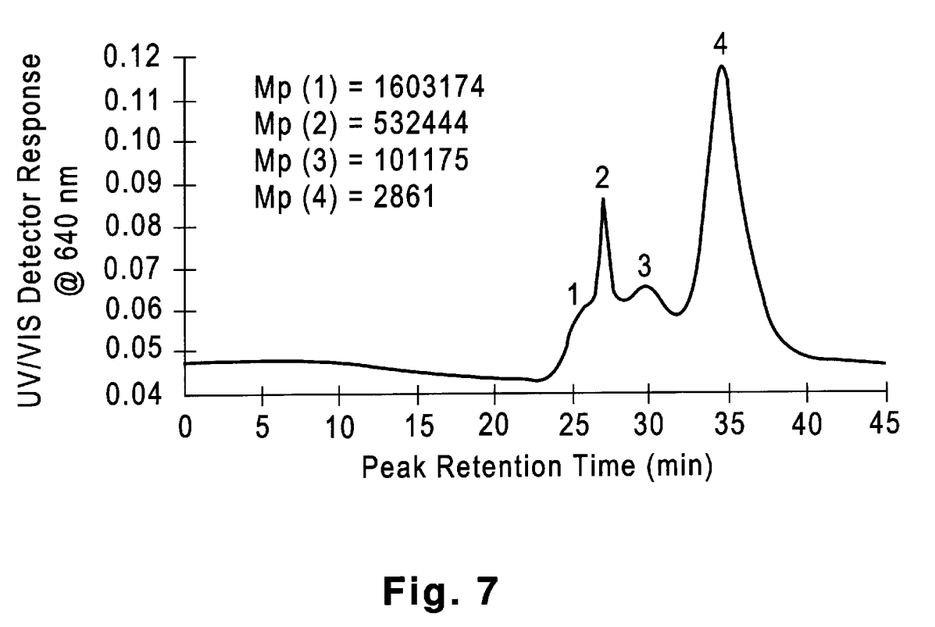
FIG. 7 shows GPC curves for branched polyaniline solutions in NMP: (a) polymer made with 2.5 mole % of bifunctional m-PDA (b) polymer made with 5.0 mole % of bifunctional m-PDA (c) polymer made with 10 mole % of bifunctional m-PDA.

The addition of branch units to polyaniline base also results in a broad molecular weight distribution in which a significant increase in the high molecular weight fraction is attained as compared to the linear polymer. FIG. 7 shows GPC curves for 3 branched polyanilines. A multimodal molecular weight distribution was observed for the branched polyaniline base solutions in NMP. The area of the high molecular weight fractions increased as the degree of branching increased (comparison of a–c in FIG. 7).

Figure 8A:
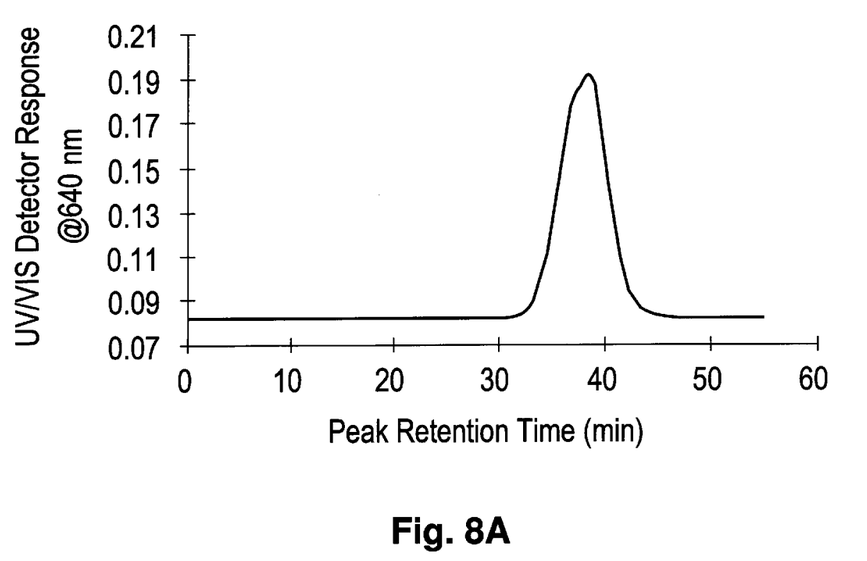
FIG. 8 is the GPC for branched polyaniline base solution in NMP with 0.5% LiCl (a)polyaniline made with 5 mole % bifunctional m-PDA (b) polyaniline made with 10 mol % bifunctional m-PDA.
Figure 8B:
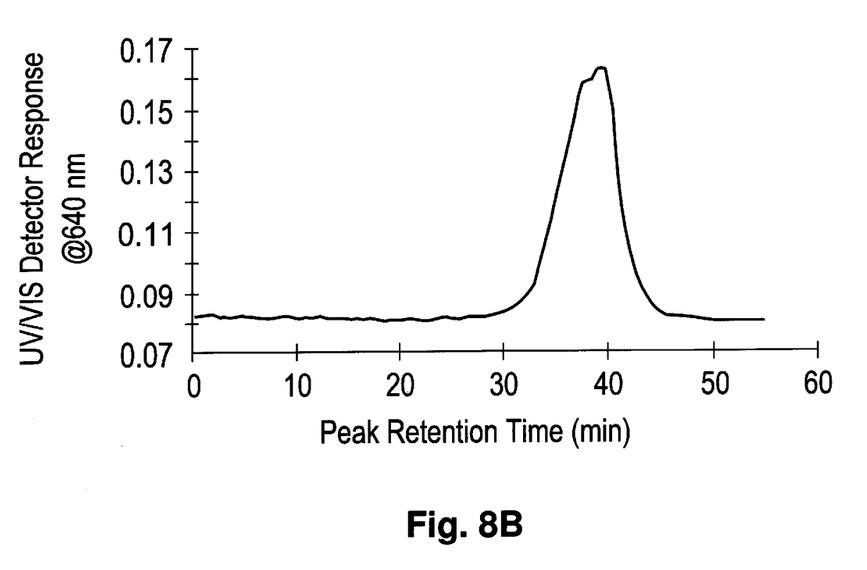

The high molecular weight fractions in the linear polyaniline base are due to aggregation of chains that form as a result of interchain H-Bonding as previously described in U.S. patent application Ser. No. 08/370,128. Because of the additional amine functionality in the branch sites of the present polymers, higher degree of H-bonding is attained. The branching itself also contributes to the high molecular weight fraction as can be seen upon addition of LiCl. LiCl can disrupt the interchain H-bonding but it cannot eliminate branching. Thus, even with the addition of LiCl, (FIG. 8.a) a bimodal molecular weight distribution is observed in which two peaks which are somewhat overlapping are present. As the branching is increased, the distribution of the two peaks broadens and becomes more evident as shown in FIG. 8.b).

The density of branching and the length of the branch can be adjusted by adjusting the amount of multifunctional monomer in the polymerization reaction. The addition of multifunctional monomer can be 0.001 to 100 mole %, more preferably from 0.001 to 30 mole % and most preferably from 0.001 to 20 mole %.

The solubility of the polyaniline is also impacted by the degree of branching. The solubility decreases as the branching increases. Polymers attained from 50 mole % input of m-PDA are insoluble. It is therefore critical to control degree of branching as to control the properties of polyaniline.

Figure 9:
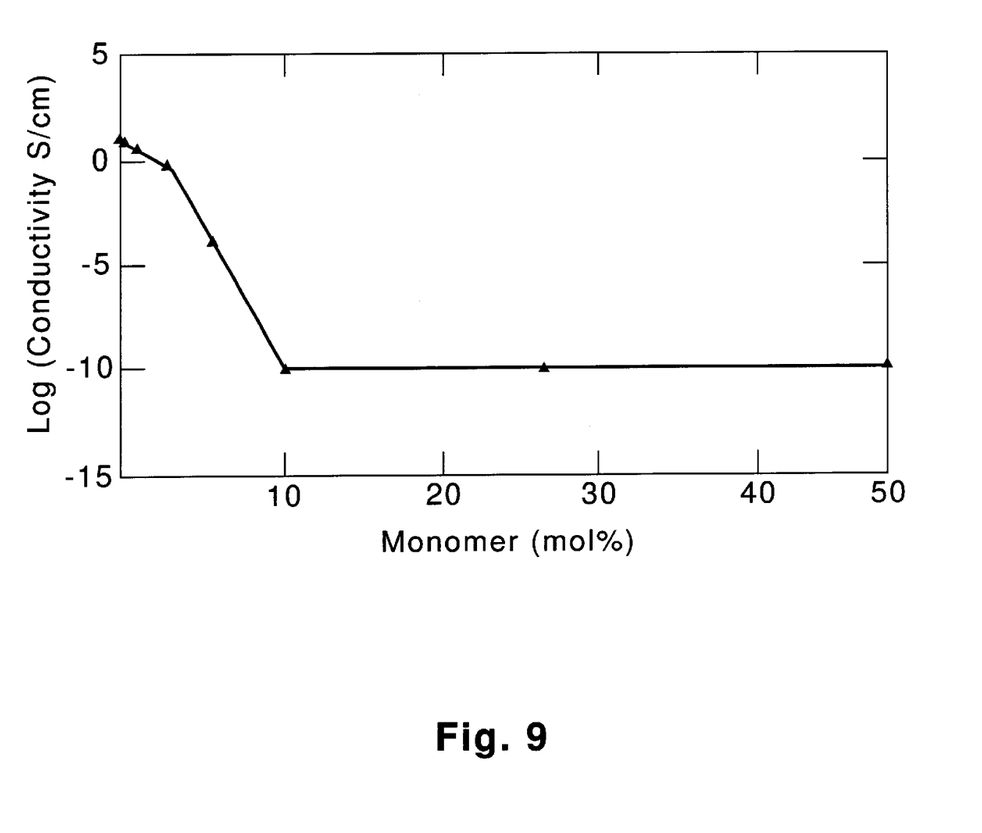
FIG. 9 shows a semilog plot of the conductivity of a branched polyaniline vs. mole % of bifunctional m-PDA monomer in the polymerization reaction with aniline.

FIG. 9 shows a plot of conductivity of a polyaniline film processed from NMP and doped with aqueous hydrochloric acid vs. the mole % of the bifunctional, m-PDA, in the copolymerization reaction. It is seen that the conductivity remains relatively high up to about 5 mole % bifunctional monomer, falls rapidly between about 5 mole % to about 10 mole % and thereafter remains constant at about $10^{-10}$ S/cm.

The electrical conductivity for the linear polymer doped with aqueous hydrochloric acid is $\cong$1 S/cm. It is impressive to find that up to 5 mole % m-PDA can be incorporated into the polyaniline backbone without significant decrease in the conductivity in view that the branch is a relatively bulky side group. Bulky substituents incorporated into polyaniline generally results in a dramatic decrease in the conductivity as a result of steric constraints which causes ring twisting and thus reduces intrachain mobility and also these groups act as bulky spacers increasing the interchain distance and thus decreasing the interchain mobility. The reason that the branch sites do not substantially decrease the conductivity is probably due to the fact that they provide another route via the branch sites for carriers to get from one chain to another. As the branching, however, gets too high, the steric constrains of the side groups becomes dominant. Also, at high branching it becomes quite difficult to dope these polymers as the dopant cannot diffuse readily into a highly branched polymer structure.

A general formula for a multi-functional or polyfunctional monomer is where X is the base unit of the monomer, M is the functional unit or polymerizable functionality and n>1 wherein n is the degree of functionalization of the monomer. Examples of base units X are aniline, any substituted aniline derivative, pyrrole, furan, thiophene, thianaphthene, phenyl, phenylenevinylene, phenylenesulfide, acetylene, etc. The above monomers can be substituted in any position. Examples of substituted monomers or X include o-ethoxyaniline, m-ethoxyaniline, 2-aminobiphenyl, 3-aminobiphenyl, aniline-2-sulfonic acid, N-phenyl-1, 4phenylenediamine, 2,4,6triphenylaniline, terthiophene, bithiophene, bipyrrole, terpyrrole, biphenyl, terphenyl, etc. The substituents can be any aliphatic or aromatic organic radical or any inorganic or metal radical. Examples of functional units M are —NH2, —NRH, —NR2—, —NH—, —NR—, (—NH3)+A— ammonium salt, (—NH2R)+A—, (—NR3)+A—, (—NR2H)+A—, SH, SR, OH, OR, CH2, CR2, CHR, CH, CR, CH3, CH2R, CR2H, CR3 (where A— is a counter anion such as, for example, Cl—, sulfonate and tosylate, etc.) The above functional units M can be substituted in which the substituent R can be any organic or inorganic radical.

Figure 10:
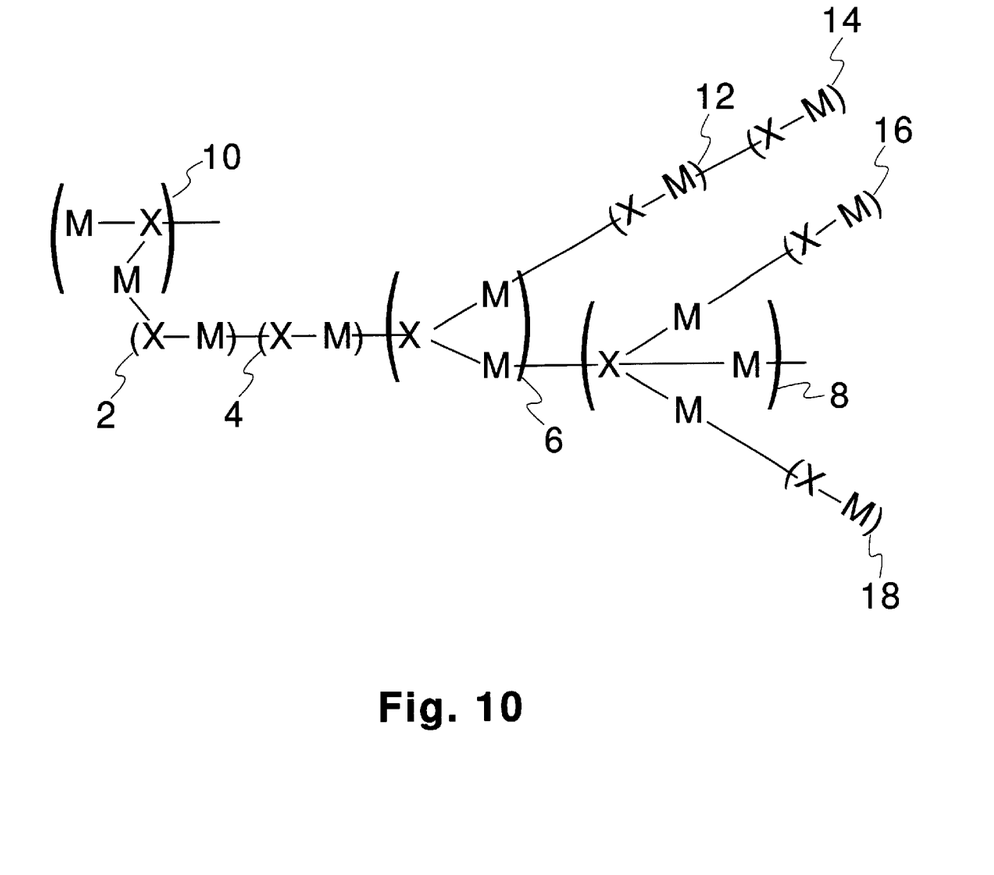
FIG. 10 schematically shows a branched polymer according to the present invention containing different polymerized functional units X—(m)$_n$.

FIG. 10 schematically shows branching of monomers of the form X—M and multi-functional or polyfunctional monomers of the form $(X—M)_n$, n>1 where X and M are as defined above. In FIGS. 10, 2, 4, 12, 16 and 18 are monofunctional monomers, 6 and 10 are bifunctional monomers and 8 is a trifunctional monomer. In the structure in FIG. 10 all X and M can be the same or different. As seen in FIG. 10 the degree of branching is controlled by the number or density of monofunctional monomers (n=1) and the number or density of multifunctional monomers (n>1). The desired combination of desired physical properties are achieved by the appropriate combination of monomeric units having different degrees (i.e. different n) of functionalization.

SPECIFIC EXAMPLES

Linear Polyaniline Synthesis

Polyaniline is synthesized by the oxidative polymerization of aniline using ammonium peroxydisulfate in aqueous hydrochloric acid. The polyaniline hydrochloride precipitates from solution. The polymer is then neutralized using aqueous ammonium hydroxide. The neutralized or non-doped polyaniline base is then filtered, washed and dried. Polyaniline can also be made by electrochemical oxidative polymerization as taught by W. Huang, B. Humphrey, and A. G. MacDiarmid, J. Chem. Soc., Faraday Trans. 1, 82, 2385, 1986, the teaching of which is incorporated herein by reference.

Branched Polyaniline Synthesis

Branched polyaniline is synthesized by the oxidative co-polymerization of aniline and 1,3-phenylenediamine (m-PDA) using ammonium peroxydisulfate in aqueous hydrochloric acid. The molar feed ratio of the m-PDA in the polymerization reaction was varied from 0 to 100%. Fully branched polyaniline was attained by polymerizing m-PDA. Copolymers were attained by controlling the ratios of the aniline and m-PDA. The aniline/m-PDA to ammonium peroxydisulfate ratio was 1:0.25, 1:0.5, and 1:1. After the polymerization reaction proceeded for 4 hours, the branched polyaniline hydrochloride was isolated by filtering, washing, and drying. The polymer can then be neutralized by using aqueous ammonium hydroxide. The neutralized or non-doped polyaniline base is then filtered, washed and dried. Branched polyaniline can also be made by electrochemical oxidative polymerization as taught by W. Huang, B. Humphrey, and A. G. MacDiarmid, J. Chem. Soc., Faraday Trans. 1, 82, 2385, 1986 by electrochemically copolymerizing aniline and m-PDA.

Branched Polyaniline Base in NMP

The branched polyaniline base powder is readily dissolved in NMP. Thin films (on the order of a micron) can be formed by spin-coating. Thick films are made by solution casting and drying (70° C. in vacuum oven under a nitrogen purge for 15 hours).

Doped Branched Polyanilines

Branched polyaniline base films made as described above were doped by aqueous acid solutions of hydrochloric or methanesulfonic acid. The films were immersed in the acid solution for 12 hours for thin films and 36 hours for the thick films. The conductivity of a pani base film processed from NMP and doped with these acid solutions is 1 S/cm.

In addition, the various branched polyanilines can be doped in solution such as in NMP, m-Cresol, Dimethylpropylene urea, NMP/LiCl, with various sulfonic acids such as toluenesulfonic acid, camphor sulfonic acid, dodecylbenzenesulfonic acid, acrylamido-2-methyl-propanesulfonic acid (described in U.S. patent application Ser. No. 08/595,853 filed on Feb. 2, 1996, to Angelopoulos et al., the teaching of which is incorporated herein by reference.

In addition, a branched polyfunctional dopant can be used as a template to polymerize a linear or a branched doped electrically conductive polymer following the linear template polymerization taught in U.S. Pat. No. 5,370,825, the teaching of which is incorporated herein by reference.

The polyfunctional dopant preferably includes acidic groups. The acidic group can be pendant directly from the polymer backbone, or can be a substituent on another group which is itself pendent from the polymer backbone. Preferred polyacids have polymer backbones which are vinylic, that is, composed of repeating units of the generalized formula —(CH2CHX)—, wherein X is an acid group or is a substituent which is substituted with an acid group. Preferred examples of polyacids include poly(styrene sulfonic acid), poly(acrylic acid), poly(methacrylic acid), poly(vinyl sulfonic acid), poly(vinyl sulfuric acid), poly(vinyl boric acid), poly(styrene boric acid), poly(vinyl phosphoric acid), and poly(styrene phosphoric acid). The preferred polyacid is poly(styrene sulfonic acid), referred to at points herein as PSSA. It should also be recognized that polyacids suitable for the practice of the present invention may comprise copolymers some repeating units of which contain pendant acidic groups as described hereinabove and other repeating units of which do not, provided that such copolymeric polyacids exhibit the desired solubility in water. Such copolymers can be blocked copolymers, or copolymers in which acidic and non-acidic monomeric units are interspersed.

In addition, the substituted monomer used to polymerize the branched polymers described herein can have substituents which self dope the polymer to the conductive form without the need for a separate dopant. Such substituents include sulfonic acid, carboxylic acid, phosphonic acid, boric acid groups, etc., i.e. any substituent having a proton or alkyl group.

While the present invention has been shown and described with respect to a preferred embodiment, it will be understood that numerous changes, modifications, and improvements will occur to those skilled in the art without departing from the spirit and scope of the invention.

TABLE 1

| Material | Glass Transition Temperature (° C.) |
| --- | --- |
| Linear Polyaniline Base | ~250° C. |
| Branched Polyaniline Base made with 0.5 mole % m-PDA in polymerization reaction | 256° C. |
| Branched Polyaniline Base made with 1.0 mole % m-PDA in polymerization reaction | 270° C. |
| Branched Polyaniline Base made with 5.0 mole % m-PDA in polymerization reaction | 323° C. |

* Polymerization included aniline as the remainder mole % monomer

What is claimed is:

1. A structure comprising a branched electrically conductive polymer, said branched electrically conductive polymer comprising: at least a portion of polymerized multifunctional units, said units containing more than one polymerization site, and; a branched polymeric polyfunctional dopant, said dopant comprising acidic groups selected from the group consisting of acid groups pendent directly on the polymer backbone and acidic groups that are substituents on another group which is itself pendent from the polymer backbone.

2. The structure of claim 1 wherein said polymerized multifunctional units are 1,3-phenylenediamine.

3. A structure according to claim 1 wherein said polymerized multifunctional units is selected from the group consisting of substituted and unsubstituted polyparaphenylene vinylenes, polyparaphenylenes, polyanilines, polythiophenes, polyazines, polyfuranes, polythianaphthenes, polypyrroles, polyselenophenes, poly-p-phenylene sulfides, polyacetylenes formed from soluble precursors, combinations thereof and blends thereof with other polymers and copolymers of monomers thereof.

4. A structure according to claim 1 wherein a dopant is present and wherein said dopant is selected from the group consisting of an acid, a Lewis acid, an alkylating agent, an oxidizing agent and a reducing agent.

5. A structure according to claim 1 wherein said polymerized multifunctional units have structural formula $$X-(M)_n$$

wherein for said portion $n \geq 1$ and M is a polymerization functional site and X is a base unit wherein at least one of said plurality of units has a value of n=1.

6. A structure according to claim 5 wherein said polymer has a branch density, said branch density being adjustable by forming said polymer as a reaction product of said polymerized multifunctional units, different portions of said polymerized multifunctional units comprising different values of n.

7. A structure according to claim 5 wherein X is selected from the group consisting of substituted and unsubstituted aniline, pyrrole, furan, thiophene, thianaphthene, phenyl, phenylenevinylene, phenylenesulfide and acetylene and wherein M is selected from the group consisting of —NH2, —NRH, —NR2—, —NH—, —NR—, (—NH3)+A— ammonium salt, (—NH2R)+A—, (—NR3)+A, (—NR2H)+A—, SH, SR, OH, OR, CH2, CR2, CHR, CH, CR, CH3, CH2R, CR2H, CR3, wherein A— is a counter anion and R is selected from the group consisting of an organic and inorganic radical.

8. A structure according to claim 7 wherein said counter anion is selected from the group consisting of Cl—, sulfonate anions and tosylate anions.

9. A structure according to claim 5 wherein all said X can be the same or different and wherein all said M are the same or different.

10. A structure according to claim 5 wherein said branched structure is a polymerization product of said units polymerized through said polymerization functional sites M.

11. A structure according to claim 1 wherein said structure is an electrically conductive polymer having said branched polymer structure, said electrically conductive polymer with said branched polymer structure has an electrical conductivity greater than an unbranched corresponding electrically conductive polymer.

12. A structure according to claim 1 wherein said branched polyfunctional dopant has a controlled degree of branching, said degree is greater than 0% of said polymer and less than or equal to 100% of said polymer.

13. A structure according to claim 1 wherein said structure is an electrically conductive polymer wherein said structure has a plurality of constituents with varying degrees of branched polymerization.

14. A structure according to claim 13 wherein said degree is less than about 20 mole % of the total amount of said units.

15. A structure according to claim 1 wherein said structure is selected from the group consisting of a fiber of said polymer, a coating of said polymer on a substrate, and a structural unit formed from said polymer.

16. A structure according to claim 1 wherein said units are polymerization units selected from the group consisting of monomers and oligomers.

* * * * *